US012676880B1

(12) United States Patent
Collison et al.

(10) Patent No.: US 12,676,880 B1
(45) Date of Patent: Jul. 7, 2026

(54) SECURE SESSION RESUMPTION PROTOCOL SELECTION BASED ON NETWORK CONDITION ANALYSIS

(71) Applicant: Amazon Technologies, Inc., Seattle, WA (US)

(72) Inventors: Steven Collison, Seattle, WA (US); Cameron Jared Bytheway, Saratoga Springs, UT (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 18/341,709

(22) Filed: Jun. 26, 2023

(51) Int. Cl.
$H04L\ 43/0864$ (2022.01)
$H04L\ 9/40$ (2022.01)

(52) U.S. Cl.
CPC ...... $H04L\ 63/1441$ (2013.01); $H04L\ 43/0864$ (2013.01)

(58) Field of Classification Search
None
See application file for complete search history.

(56) References Cited

U.S. PATENT DOCUMENTS

| | | | | |
|---|---|---|---|---|
| 2018/0316724 | A1* | 11/2018 | Reddy | H04L 63/0435 |
| 2021/0119974 | A1* | 4/2021 | Wang | H04L 63/166 |
| 2021/0281607 | A1* | 9/2021 | Green | H04L 67/141 |
| 2022/0247823 | A1* | 8/2022 | Cunningham | H04L 67/148 |
| 2023/0308271 | A1* | 9/2023 | Seaborn | H04L 9/0869 |
| 2023/0319148 | A1* | 10/2023 | Cunningham | H04L 67/148 |
| | | | | 709/227 |

FOREIGN PATENT DOCUMENTS

| | | | |
|---|---|---|---|
| CN | 106817219 A | * | 6/2017 |

OTHER PUBLICATIONS

English Translation of CN-106817219-A, 17 pages, published Jun. 9, 2017 (Year: 2017).*
Translation of CN106817219.*
E. Rescorla, "The Transport Layer Security (TLS) Protocol Version 1.3", Retrieved from https://datatracker.ietf.org/doc/html/rfc8446, Aug. 2018, pp. 1-160.
Hussein Nasser, "The danger of TLS Zero RTT—Why early data is subject to Replay attacks", Retrieved from https://medium.com/@hnasr/the-danger-of-0-rtt-a815d2b99ac6#:~:text=0-RTT is a powerful,a TLS sequence of 0, Feb. 15, 2023, pp. 1-13.

\* cited by examiner

*Primary Examiner* — Joshua Joo
(74) *Attorney, Agent, or Firm* — Robert C. Kowert; Kowert, Hood, Munyon, Rankin & Goetzel, P.C.

(57) ABSTRACT

Embodiments of secure session resumption protocol selection based on cost analysis are disclosed. Session resumption requests are received from clients (e.g., as packets). A cost (e.g., network latency time) associated with a client-round-trip-based resumption process that requires a round trip between the server and the client is determined. Another cost associated with a no-round-trip-to-client-based resumption process is determined (e.g., network latency to access a session state data store and/or session state data store processing time). The costs are analyzed in order to select which session resumption process is used to resume the requested session. The session is resumed using the selected session resumption process. In some embodiments, a particular secure session resumption protocol may be selected based on classification of the client into a category that estimates a roundtrip time between the client and the server.

20 Claims, 9 Drawing Sheets

SECURE SESSION RESUMPTION PROTOCOL SELECTION BASED ON NETWORK CONDITION ANALYSIS

BACKGROUND

Cryptographic protocols are designed to provide communication security over a computer network. Such protocols are widely used in such examples as, but not limited to, applications such as email, instant messaging, and voice over IP, and are also prevalent in securing network connections, such as HTTPS.

In one example of a cryptographic protocol, transport layer security (TLS) aims primarily to provide security, including privacy (confidentiality), integrity, and authenticity through the use of cryptography, such as the use of certificates, between a client and application, or between two or more communicating computer applications, for example.

Default behavior of some such cryptographic protocols may not always provide optimal performance across all types of network architectures.

Figure 1A:
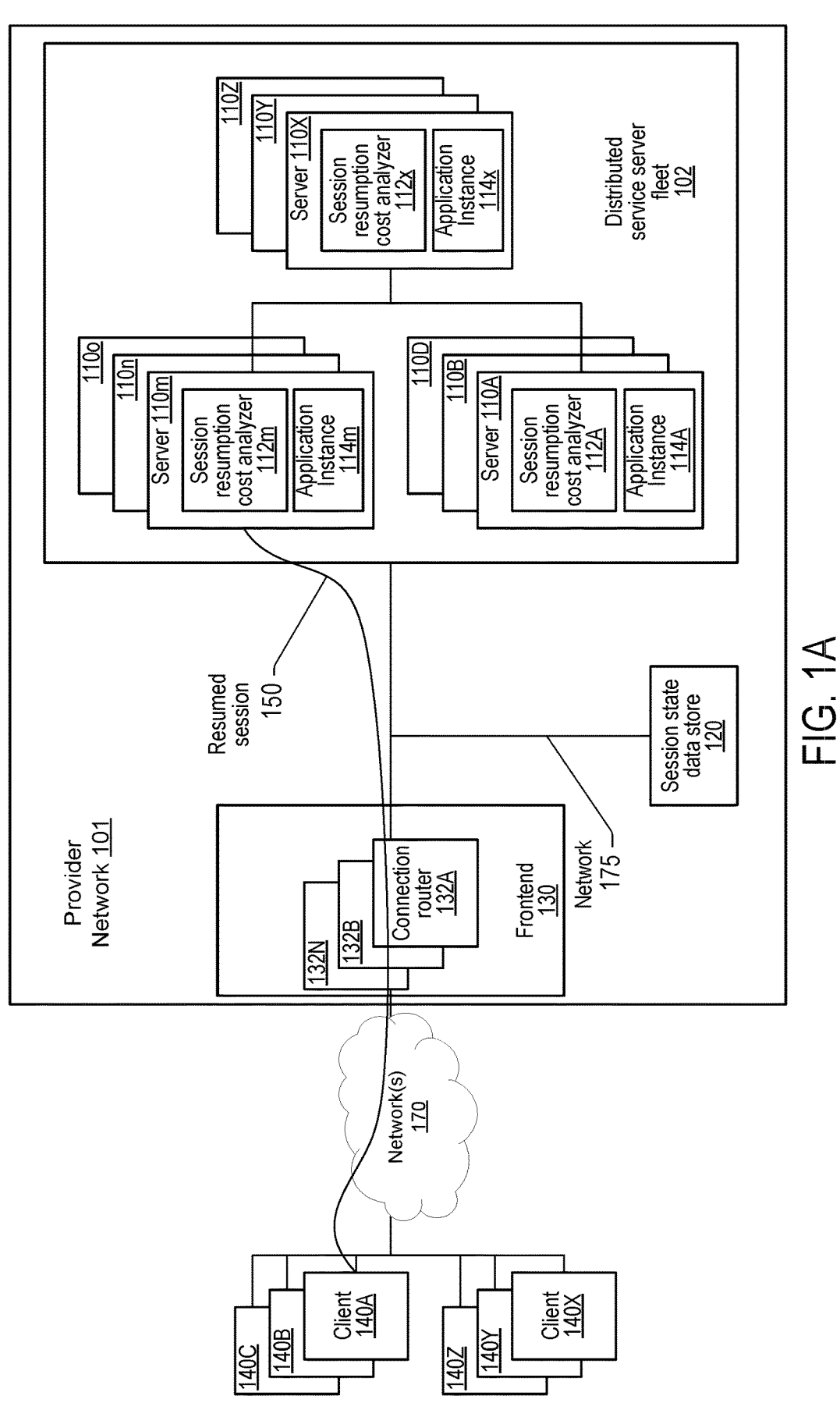
FIGS. 1A and 1B are block diagrams that illustrate logical architectures for a system for secure session resumption protocol selection based on resource analysis, according to some embodiments.

While the solution is described herein by way of example for several embodiments and illustrative drawings, those skilled in the art will recognize that the solution is not limited to the embodiments or drawings described. It should be understood, that the drawings and detailed description thereto are not intended to limit the solution to the particular form disclosed, but on the contrary, the intention is to cover all modifications, equivalents and alternatives falling within the spirit and scope of the present solution. Headings used herein are for organizational purposes only and are not meant to be used to limit the scope of the description.

DETAILED DESCRIPTION OF EMBODIMENTS

As discussed in more detail below, systems and methods for embodiments of secure session resumption protocol selection based on resource analysis are disclosed. In an example embodiment, request-generating clients (e.g., processes or applications, etc.) generate and send session resumption requests (e.g., as packets) to servers (e.g., to servers executing an application to which the clients were previously engaged via a secure session that was interrupted or dropped). Connection managers at the servers that receive the resumption requests may have a number of different resumption protocols to select from, responsive to the request. In embodiments herein, the connection manager may determine costs associated with respective resumption protocols (e.g., resource costs such as network latency, processing costs, etc.), analyze the costs (e.g., weighting the costs variously, or using configurable or established thresholds based on the costs, etc.), and select a particular session resumption process to resume the requested session.

In some embodiments, the connection manager may function to make an unexpected selection of a session resumption process that is a different selection from what prior connection managers would have selected, given similar circumstances. For example, the connection manager may, for a protocol that would normally attempt a no-round-trip-to-client-based resumption process before falling back to a client-round-trip-based resumption process, skip the no-round-trip-to-client resumption process and use the client-round-trip resumption process. A connection manager may skip the no-round-trip-to-client resumption process and use the client-round-trip-based resumption process based on analysis of costs associated with using each process, such as when the client-round-trip-based resumption process is less costly (an unexpected occurrence not accounted for by prior resumption protocols) for example. Non-exhaustive examples of the client-round-trip-based resumption process being less costly is when the client is located near-to the server (e.g., when the requesting client and target server are on a same network (e.g., a same service provider network) or when the session state data store (associated with the no-round-trip-based resumption process) is under high processing demand. Non-exhaustive examples of the client-round-trip-based resumption process being more costly is when the requesting client is more distant from the service (e.g., over a mobile wide area network, or in a distant region, etc.). The session is resumed using the selected session resumption process, absent errors, in embodiments.

In embodiments, characteristics about how a client is connecting to a server (e.g., network resources, session state processing (CPU) resources required, various latencies, characteristics of the requesting client or target server) may be used to determine that a particular resumption protocol used to process the secure session resumption request.

In some embodiments, a client request to resume a secure session indicates (or is assumed to be requesting, in accordance with the particular protocol, for example) that a no-round-trip-to-client resumption process is specifically requested. In embodiments, the server may decline the request for the no-round-trip-to-client resumption process, because the no-round-trip-to-client resumption process is unsupported or for security reasons, for example. In some embodiments, the server may decline the request for the no-round-trip-to-client resumption process and instead require use of the client-round-trip-based resumption process, because the client-round-trip-based resumption process is determined to be a better performance choice than the no-round-trip-to-client resumption process (e.g., the client-round-trip-based resumption process may be associated with a lower overall cost, sometimes indicative of a lower network latency, for example).

A number of technical benefits may accrue to systems that implement such features as those disclosed herein, in certain embodiments. For example, (1) client connection performance may be increased because a better performing session resumption protocol is selected for the network path. In another example, cryptographic operations are particularly computationally intensive; (2) avoidance of unnecessary or repetitive cryptographic operations (e.g., such as via reuse of already-established cryptographic keys/certificates) can free up resources for other uses. Additionally, at least to the extent that the no-round-trip-to-client resumption process is used less often, (3) network calls to the corresponding remote session state data store associated with the no-round-trip-to-client resumption process are reduced, eliminating at least some network traffic over the network to the data store and freeing up processing load at the data store as well as reducing the amount of storage needed for the system to operate. In large-scale systems responding to large amounts of connection requests, including session resumption requests, the resource savings are significant. Furthermore, at least to the extent that encrypted application data can be included in a secure session resumption initiation packet (based on a prior-established key that is re-used as described herein) (4) network traffic is reduced and (5) the encrypted application data can be processed more quickly. Thus, in addition to freeing up network, computing, and storage resources for other uses, application data may be processed more quickly, in accordance with embodiments described herein.

Application Data in First Packet

Some secure session protocols facilitate clients sending application data in the first data packet sent to a server (e.g., in the ClientHello for the protocol). For example, TLS "0-RTT" may include application data in the ClientHello packet for that protocol. Some such protocols may be implemented with a data store (e.g., for storing single-use tickets or similar mechanism for maintaining state to prevent replay attacks) on the server side. For servers behind load balancers (or behind other types of connection routers) or some other mechanism that prevents "stickiness" on client reconnects, a distributed session state data store may be used to share state amongst servers. In contrast to 0-RTT resumption, TLS1.3 also supports "1-RTT" resumption (one example of a client-round-trip-based resumption process) which may be implemented with session tickets that do not require server-side storage (such resumption may be "stateless" in embodiments).

In embodiments when a distributed session state data store is used on the server side (e.g., to implement 0-RTT or other no-round-trip-to-client-based resumption process) the server will incur latency and resource impact or usage costs (e.g., network connection, cpu processing) in order to contact the remote session state data store. For some cases, the cost of contacting the remote session state data store (e.g., as in the no-round-trip-to-client resumption process, where the remote data store is contacted to check for a session ticket to prevent replay attacks or the like) may outweigh the performance benefits of a client-round-trip resumption process like 1-RTT. For example, clients that connect to the service over short network links might have a lower total cost for session resumption using a client-round-trip resumption process (an outcome unexpected by prior protocols that attempt the no-round-trip-to-client resumption process first, instead, based on an assumption that the no-round-trip-to-client resumption process always exhibits better performance).

In embodiments, a determination to use a client-round-trip resumption process instead of a no-round-trip-to-client resumption process may be based on which option is associated with the least costly overall option (e.g., which option has the least costly cost function).

In an example, it may be determined that client-to-server network round trip time (RTT) is 0.5 milliseconds (ms), that the particular server's RTT to the session state data store 120 (e.g., to examine a single use ticket) is also 0.5 ms, and that the remote session state data store 120 processing time is 0.05 ms (e.g., session data store transactions per second (TPS) may also be used as a metric that serves as a basis for determined the value of the corresponding cost function, in embodiments). A resumption handshake processing time may be considered as having a same value in either case, for the sake of this example, but may differ for different resumption protocols (based on different encryption algorithm performance), or for different requesting clients (e.g., based on distance or network performed), in other embodiments.

In such an example, Client-round-trip-based resumption process cost=resumption_handshake_processing_time+client-to-server network round trip time (RTT) which is 0.5 milliseconds (ms)=resumption_handshake_processing_time+0.5 ms.

In the same example, No-round-trip-to-client-based resumption process=resumption_handshake_processing_time+server's RTT to the session state data store 120 (0.5 ms)+remote_data_store_processing_time (0.05 ms)=resumption_handshake_processing_time+0.55 ms.

In the above example, the cost of performing session resumption via the client-round-trip resumption process is 0.05 ms less than no-round-trip-to-client resumption process. Note that a resumption protocol that assumes that the no-round-trip-to-client resumption process is always the less costly option would be making a less-efficient choice, under the above-noted circumstances. That is, without benefit of the embodiments disclosed herein, a client would see worse latency from using the no-round-trip-to-client resumption process in the case of a distributed data store and the above-noted performance measures, in embodiments.

In embodiments disclosed herein, functionality may be implemented on a server (e.g., as part of a secure session connection manager 302) that (unexpectedly) skips a no-round-trip-to-client resumption process and instead implements a client-round-trip resumption process when one or more criteria are met (e.g., when latency savings associated with the no-round-trip-to-client resumption process are not great enough). In embodiments, functionality on the server may determine that the latency savings are not great enough by comparing the network round-trip-time (RTT) of a connection against a known threshold where the resumption protocol that skips a round-trip RTT between the client and server but uses a session data store access is not beneficial. For example, such a threshold may be determined by estimating latency over the network between the server and session state data store and resource cost (processing time/cycles) at the session state data store.

In embodiments, some such threshold may be configurable (e.g., by an administrator or otherwise), statistically determined, adaptable over time, or based on local memory or CPU usage. For example, if such a no-round-trip-to-client threshold is set to 0.2 ms (e.g., based on configuration, or statistically determined, or is adaptable over time, or based on local memory or CPU usage) the server may include logic (e.g., executable program instructions) that selects between the resumption processes, based on a comparison of the costs. In some embodiments the comparison may implement a bias. For example, the system may be configured to select the no-round-trip-to-client resumption process based on the cost of the no-round-trip-to-client resumption process being less than the client-round-trip-based resumption process by the threshold amount (e.g., 0.2 ms in this example). In such circumstances, the program logic may determine to skip the no-round-trip-to-client resumption process and use the client-round-trip resumption process because that is the least costly option (is a better use of network resources) in accordance with the bias. It is contemplated that various different biases may be implemented that bias the system towards more or less use of a particular one of the resumption protocols, such as the client-round-trip-based resumption process, in embodiments.

The connection RTT for the particular requested connection may be determined variously, such as in the following non-limiting example RTT determination techniques. In one example, connection RTT can be determined using various commands (e.g., getsocketopt( ) may be used assuming the estimated RTT is populated after the ClientHello arrives (the first client ACK)). In another example, RTT between the client and server may be based on packets exchanged during the TCP handshake. In some embodiments, RTT may be an estimate, based on average or expected RTTs for traffic of a certain type or based on traffic originating from a particular region or location.

Secure Sessions

Client-server applications use cryptographic protocols (e.g., TLS, SSL, etc.) to communicate across a network in a way designed to prevent eavesdropping and tampering. Since applications can communicate either with or without cryptographic protocols (over a secure session), it is generally necessary for the client to request that the server set up secure session.

Generally, a connection is established between two entities such as between a client and a server or between two applications (e.g., via TCP handshake). Next, the client and server may agree on a particular cryptographic protocol, and negotiate a stateful connection by using a handshaking procedure. For example, secure session protocols may use a handshake with an asymmetric cipher to establish not only cipher settings but also a session-specific shared key with which further communication is encrypted using a symmetric cipher. During this handshake, the client and server may agree on various parameters used to establish the connection's security. In embodiments, some such parameters may be considered in the cost determinations, described herein.

Secure Session Example

Generally, the handshake begins when a client connects to a secure connection-enabled server requesting a secure connection and the client presents a list of supported cipher suites (ciphers and hash functions). From this list, the server can pick a cipher and hash function that it also supports and notifies the client of the decision. The server may then provide identification in the form of a digital certificate. In embodiments, the certificate contains the server name, the trusted certificate authority (CA) that vouches for the authenticity of the certificate, and the server's public encryption key. The client confirms the validity of the certificate before proceeding. In embodiments, to generate the session keys used for the secure connection, the client either: encrypts a random number (PreSecret) with the server's public key and sends the result to the server (which only the server should be able to decrypt with its private key) (both parties then use the random number to generate a unique session key for subsequent encryption and decryption of data during the session) or uses Diffie-Hellman key exchange (or its variant elliptic-curve DH) to securely generate a random and unique session key for encryption and decryption that has the additional property of forward secrecy. This generally concludes the handshake and begins the secured connection, which is encrypted and decrypted with the session key until the connection closes. If any one of the above steps fails, then the secure connection handshake may fail and the connection is not created.

In some instances, the handshake may be condensed to only one round trip compared to the two round trips required in other versions. In such an example, the client may first send a ClientHello message to the server that contains a list of supported ciphers in order of the client's preference and makes a guess on what key algorithm will be used so that it can send a secret key to share if needed. By making a guess at what key algorithm will be used, the server can eliminate a round trip. After receiving the ClientHello, the server may send a ServerHello with its key, a certificate, the chosen cipher suite and the finished message. After the client receives the server's finished message, it now is coordinated with the server on which cipher suite to use, for example.

Resume Handshake

Public key operations (e.g., RSA) are relatively expensive in terms of computational power. Some secure connection protocols provide a secure shortcut in the handshake mechanism to avoid these operations: resumed sessions. In embodiments, resumed sessions are implemented using session IDs or session tickets, for example. Apart from the performance benefit, resumed sessions can also be used for single sign-on, as it can guarantee that both the original session and any resumed session originate from the same client. Performance could otherwise suffer from a man-in-the-middle attack in which an attacker could intercept the contents of the secondary data connections Although examples described herein generally describe selecting between two resumption protocol options, it is contemplated that similar cost determinations and selection of a particular resumption protocol may be performed for systems with three or more resumption protocol options.

Attention is now brought to the Figures. Generally, FIGS. 1A, 1B, 2, 3, 7 and 8 are block architectures of systems and components for implementing various example implementations of secure session resumption protocol selection based on resource analysis. Various functionality illustrated in process diagrams 4, 5 and 6, and/or described herein, may be performed by one or more components illustrated in FIGS. 1A, 1B, 2, 3, 7 and 8, in embodiments. Although various embodiments are illustrated and described in some detail, it is contemplated that different components than those depicted may perform some or all of the functionality and that the functionality may be performed in different sequence or in various different combinations, without departing from the scope of this disclosure.

Figure 1B:
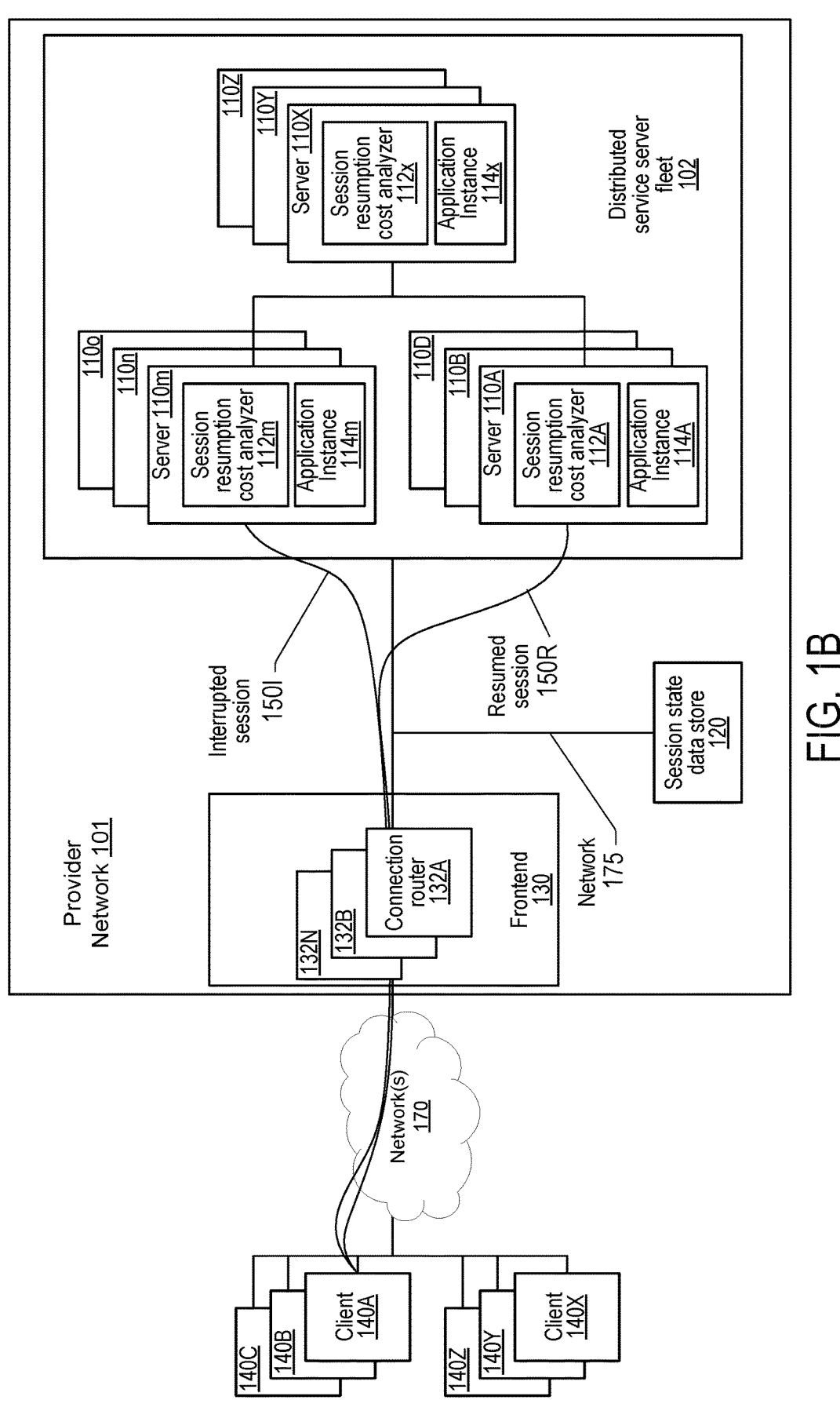

FIGS. 1A and 1B are block diagrams that illustrate logical architectures for a system for secure session resumption protocol selection based on resource analysis, according to some embodiments. Generally, client(s) (e.g., clients 140A, 140B, 140C, 140X, 140Y, 140Z, etc.) establish connections (e.g., via network(s) 170/175) with servers of a distributed service fleet 102 (e.g., servers 110A, 110B, 110C, 110M, 110N, 1100, 110X, 110Y, 110Z, etc.) that are executing an application (e.g., application instances **114A, 114*m*, 114*x* or components of an application) being accessed by the clients 140. In the illustrated embodiment, connection routers 132A, 132B, 132N (e.g., load balancers or similar, in some embodiments) of frontend 130 route the client requests to the servers 110**.

As illustrated, the frontend 130 and distributed service server fleet 102 can be part of a larger provider network 101 (also referred to as a cloud provider network). A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the customer for performing tasks specified by the customer.

Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time, but close enough together to meet a latency requirement for intra-region communications.

Furthermore, regions of a cloud provider network are connected to a global "backbone" network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers (points of presence, or PoPs). An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region.

This infrastructure design enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

The disclosed cloud provider network can offer a variety of services, including compute services (including virtual machine services, containers services, serverless function services, high performance computing services, batch computing services, and quantum computing services), storage services (including volume storage services, file storage services, and object storage services), database services, networking services, identity access and management services, security services, data streaming services, data analytics services, machine learning services, cryptographic services, blockchain services, gaming services, mobile services, Internet of Things (IoT) services, media services, satellite services, robotics services, and augmented and virtual reality (AR/VR) services. The resources required to support the operations of such services (e.g., compute and storage resources) may be provisioned in an account associated with the cloud provider, in contrast to resources requested by users of the cloud provider network, which may be provisioned in user accounts. In FIGS. 1A and 1B, for example, the distributed service server fleet 102 may be part of an elastic compute cloud service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), or an on-demand code execution service (also referred to as a serverless compute service, function compute service, functions service, cloud functions service, or functions-as-a-service, in various implementations). The session state data store 120, for example, may reside in local memory of a compute server or may be implemented in an elastic block store service (referred to in various implementations as a cloud disks service, a managed disk service, a cloud block storage service, a persistent disk service, or a block volumes service), an object storage service (referred to in various implementations as a blob storage service, cloud object storage service, or cloud storage service), or a database service. Application instances 114 may be executed on virtual machine instances, bare metal instances, containers, serverless functions, or some combination.

Prior to being provided with access to the application 114, clients 140 generally perform a TCP handshake with a server 110 and then establish a more secure session (e.g., a Secure Sockets Layer (SSL) or Transport Layer Security (TLS) session) over which application data is passed. State information and the like for the secure session may be stored to a Session state data store 120.

In embodiments, the initial secure session (or a subsequent instance of an original secure session, in embodiments) may be interrupted or dropped for any of various reasons, such as but not limited to a pause in data transmission (a time-out condition), a poor connection, failure of a server, etc. In some such circumstance a client may request to resume the secure connection (e.g., if supported by the secure session protocol being used). Such a resumption may have various benefits over establishing a new secure connection, such as re-use of already existing security features (e.g., keys, certificates, etc.) and/or delivering application data for processing by the application more quickly (e.g., because application data may be included in the secure session resumption request packet and/or because resuming the secure connection is performed more quickly).

In the illustrated embodiment, a resumed session 150 is depicted between client 140A and Server 110m. Various different secure session protocols provide for various different techniques for resuming session. In embodiments described herein, session resumption cost analyzer 112M on server 110M may select a particular one of the various different techniques for resuming sessions, based on a cost-based analysis, for example. In some embodiments, the cost-based analysis may take into consideration various factors such as network latencies, session state data store processing time or load, and the like.

FIG. 1A illustrates Session state data store 120, which stores data, such as session state data, associated with secure sessions, in embodiments. In embodiments, the Session state data store 120 may share its own utilization information with the Frontend 130 (e.g., Connection Routers 132A-N) and/or the server fleet 110A-Z, enabling those machines to decide whether or not to reduce use of the session state data store 120 when under heavy use, for example. Some such information may be used as part of the cost analysis, described herein, in embodiments.

In embodiments, FIG. 1B illustrates groups of a fleet of servers 110A-Z of a distributed service server fleet 102. In embodiments, state data may be stored in Session state data store 120. FIG. 1B illustrates that such state data may include data necessary for resumption of a prior secure connection (e.g., Interrupted session 1501) between the same client and a different one of servers 110A-Z (e.g., secure session data, single-use tokens, etc.). For example, a few of servers 110A-Z may be running instances, or components, of a same application, and a same client may resume a prior secure connection with a different one of the servers 110 running an instance or component of the same application as the prior server of the prior secure connection (e.g., resumed session 150R).

In some embodiments, client-side session tickets may be used to maintain state information used to resume a prior connection.

Figure 2:
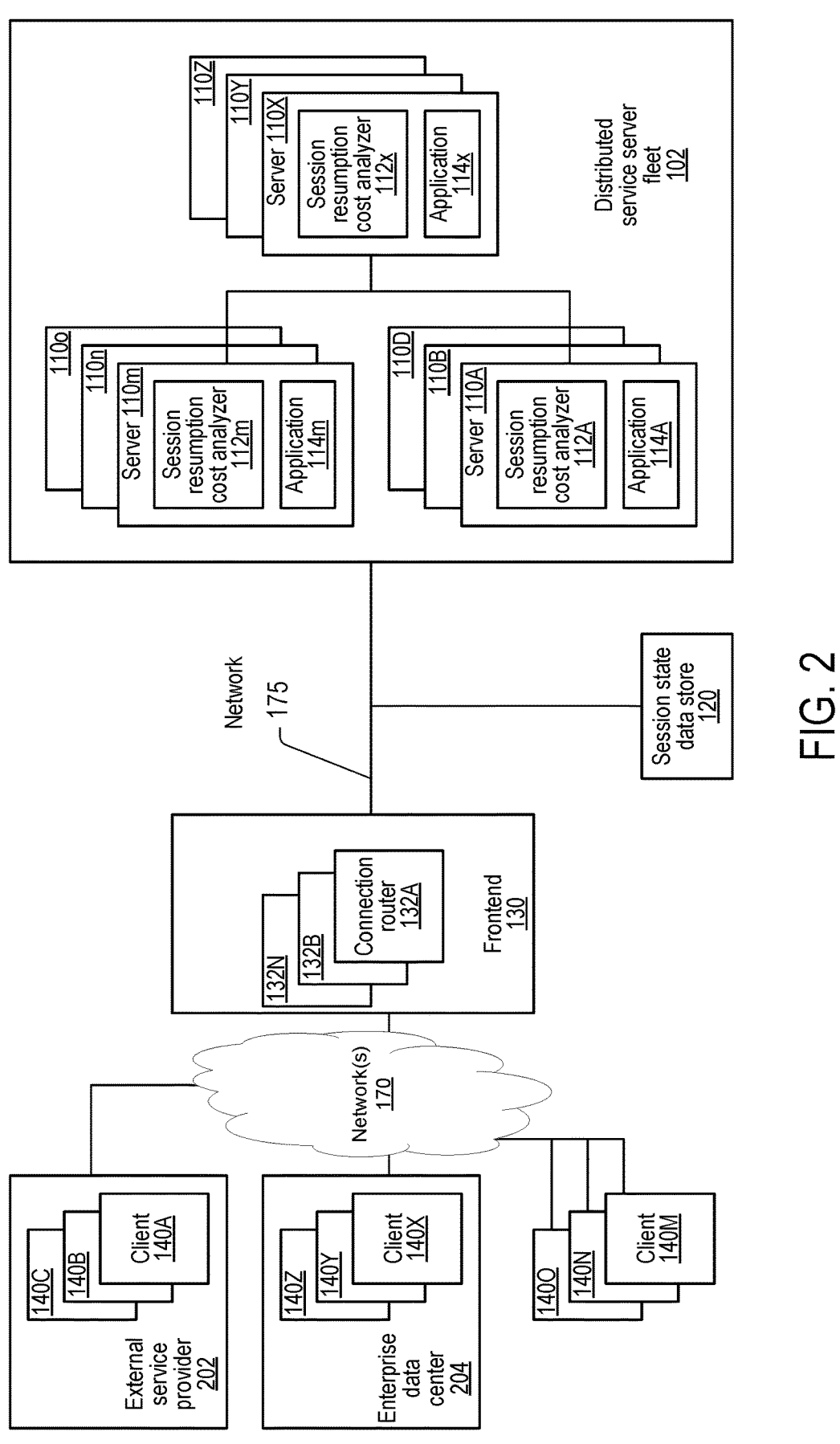
FIG. 2 is a block diagram that illustrates another logical architecture of a system for secure session resumption protocol selection based on resource analysis, according to some embodiments.

FIG. 2 is a block diagram that illustrates another logical architecture of a system for secure session resumption protocol selection based on resource analysis, according to some embodiments. In the illustrated embodiment, various different sources of client requests (e.g., Clients 140A, 140B, 140C of external service provider 202, clients 140X, 140Y, 140Z of enterprise data center 204, and other external clients 140M, 140N. 1400, etc.) send secure connection resumption requests to servers 110A-Z and respective session resumption cost analyzers 112 at the servers 110 analyze costs associated with various different resumption protocols, selecting the resumption protocol associated with the preferred cost (e.g., as illustrated in process diagrams 4 and 5). FIG. 2 illustrates that clients 140 may be located at various distances (e.g., in various geographic regions) and across various different networks from the servers 110 with which resumption of the secure connection is requested. Accordingly, different clients may be associated with different network latencies, contributing to different client RTT that can produce different client round-trip cost determinations for different clients. Similarly, servers 110A-Z may be located at different locations and different distances from requesting clients 140 as well as different distances from the session state data store 120, also contributing to different RTT that can change either of client round-trip cost determinations or no round-trip cost determinations for different secure connections with different endpoints.

Figure 3:
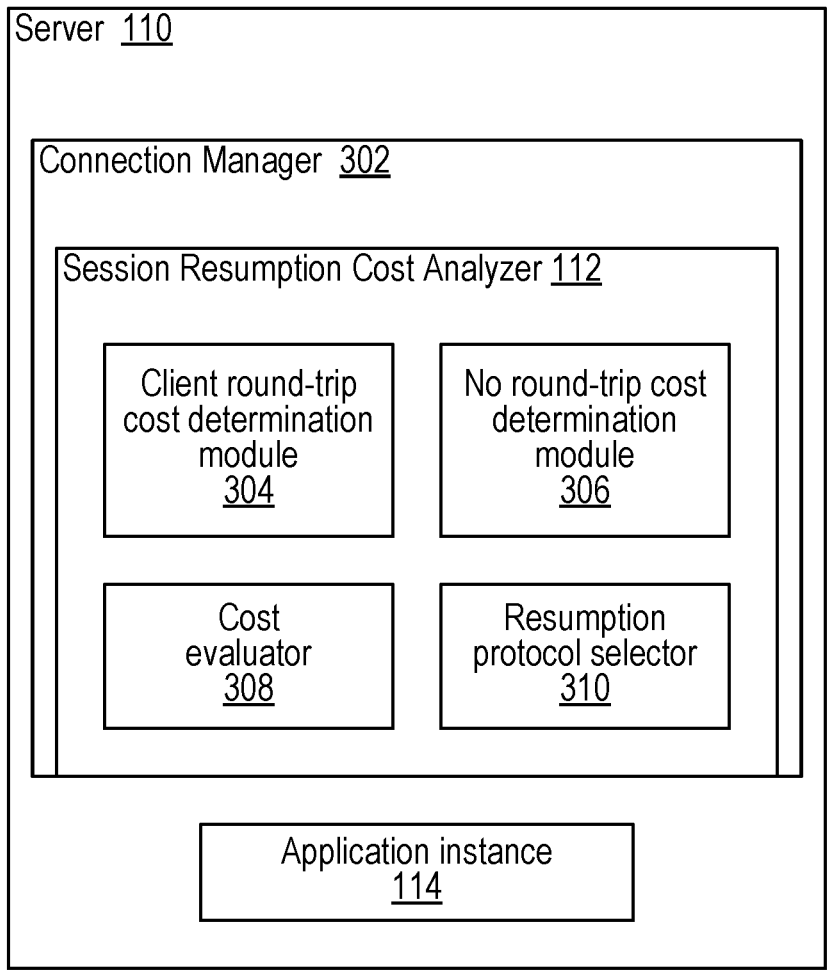
FIG. 3 is a block diagram that illustrates a logical architecture of a connection manager for a system for secure session resumption protocol selection based on resource analysis, according to some embodiments.

FIG. 3 is a block diagram that illustrates a logical architecture of a connection manager 302 for a system for secure session resumption protocol selection based on resource analysis, according to some embodiments. In embodiments, various of the illustrated components perform the functionality illustrated in FIGS. 4, 5 and 6.

In the illustrated embodiment, connection manager 302 is hosted on server 110 that also hosts application instance 114. Connection Manager 302 is illustrated with various components and modules that may rely upon various sources of data. For example, in embodiments, processing times associated with various types of data in the Session state data store 120 may be logged and made available for calculations of costs associated with a no-round-trip-to-client-based resumption process (e.g., by a metrics service of a multitenant service provider). In another example, the Connection Manager 302 may track and estimate processing times and round-trip times associated with requests made by the Connection Manager 302 to the Session state data store 120.

In some embodiments, Client round-trip cost determination module 304 of Connection Manger 302 may develop a client round-trip cost model associated with the requesting client (or associated with a group of clients, such as clients associated with a particular network clients associated with particular network traffic, clients associated with a particular region, etc.). For example, model parameters may include client response times, whether the client has dropped the connection, throughput characteristics associated with the client, types of certificate operations required for the client, types of cryptographic operations required, etc. When a connection resumption request is received for that client, the Connection Manager 302 may analyze the client round-trip cost model to determine a cost associated with a client-round-trip-based resumption process vs. a no-round-trip-to-client-based resumption process cost. The analysis may include various weightings or margins (e.g., margins of error, or the like, in some embodiments). For example, the resumption protocol selector 310 may select the particular resumption processes based on a comparison of the costs (e.g., by the Cost evaluator 308), selecting the no-round-trip-to-client resumption process based on the cost of the no-round-trip-to-client resumption process being less than the client-round-trip-based resumption process by a threshold amount. In some embodiments, the Cost evaluator 308 may apply category-based analysis (e.g., illustrated in FIG. 6, described below) as part of, or instead of, the cost-based resumption protocol selection.

In some embodiments (not illustrated) the Connection Manager 302 may execute on a server instance or machine that is distinct from another server instance or machine upon which the corresponding Application instance 114 executes.

Figure 4:
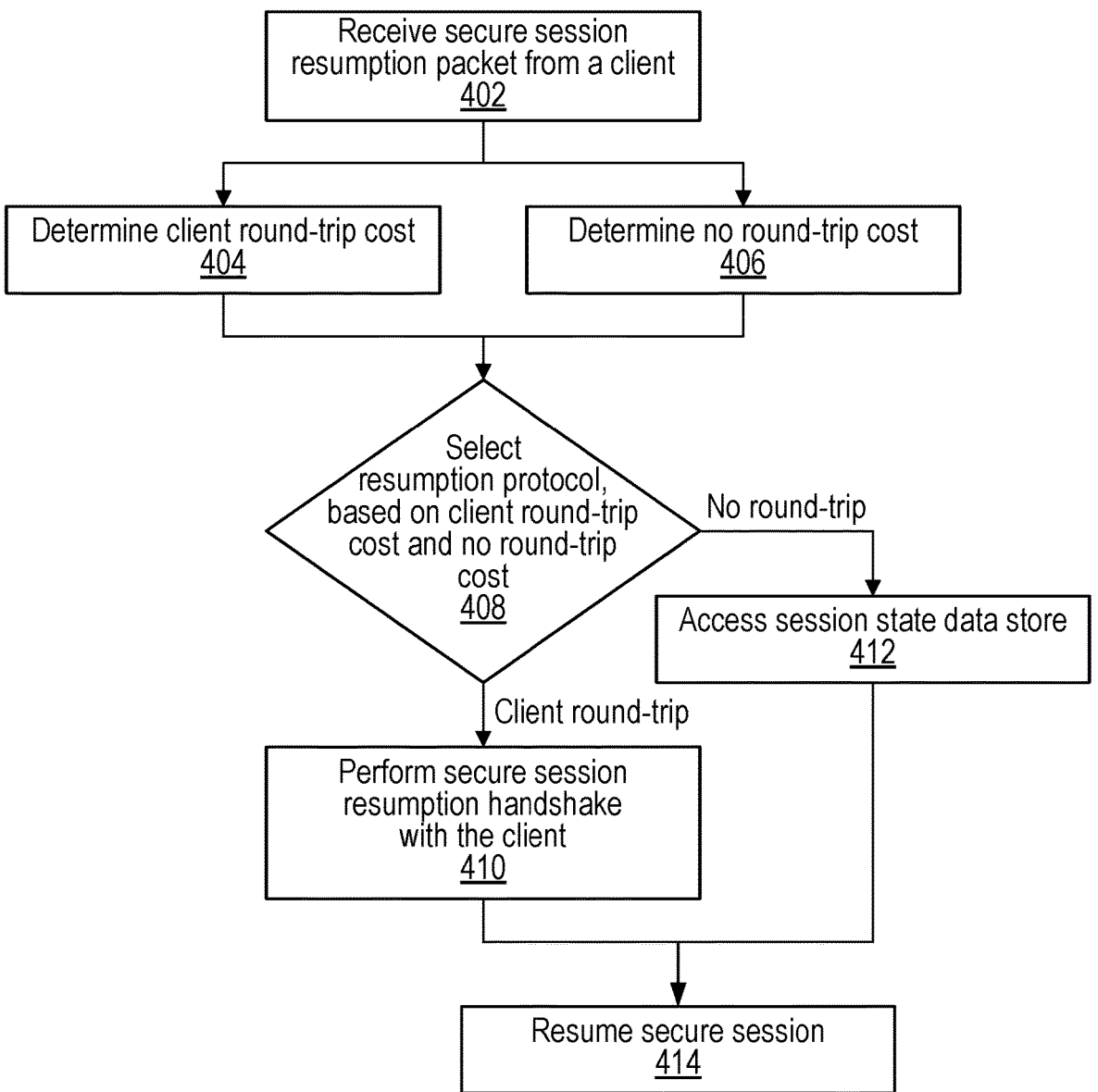
FIG. 4 is a process diagram that illustrates a packet processing process for a system for secure session resumption protocol selection based on resource analysis, according to some embodiments.

FIG. 4 is a process diagram that illustrates a packet processing process for a system for secure session resumption protocol selection based on resource analysis, according to some embodiments. Functionality illustrated in FIG. 4 may be performed by components illustrated in FIGS. 1A, 1B, 2, 3, 7 and 8, by Connection Manager 302 for example.

FIG. 4 illustrates that a secure session resumption packet is received from a client (block 402). In embodiments, the packet is received by the server via frontend 130 (e.g., Connection Router 132) between the requesting client 140 and the server 110. In the illustrated embodiment, a client round-trip cost is determined (block 404) and a no round-trip cost is determined (block 406). For example, corresponding client round-trip cost determination module 304 and no round-trip cost determination module 306 determine the respective costs.

In at least some embodiments, the costs are based on observed or estimated characteristics of the system, such as but not limited to latencies, resource usages such as CPU processing times, memory usage, transactions per second, and the like.

In embodiments, the no round-trip cost determination does account for a different round-trip cost (not an RTT between the server and the client, but instead a round trip time from the server to a distributed or remote session state data store). In embodiments, such a data store may not be a required implementation by the particular protocol (e.g., may not be included in the definition of this resumption process protocol option) but rather an implementation for security reasons, such as to prevent replay attacks.

In embodiments, costs may be determined based on various types of data and/or models. For example, the Client round-trip cost determination module 304 may determine the client round-trip cost based on round-trip times (RTT) of prior traffic between the client and server (e.g., during the immediately-prior TCP handshake or similar). In one example, connection RTT can be determined using various commands (e.g., getsocketopt( ) may be used assuming the estimated RTT is populated after the ClientHello arrives (the first client ACK)). In another example, an RTT for a client may be estimated, based on a location or geographic region associated with the client. For example, a client in the same data center as the server may be associated with an estimated RTT for traffic within that data center (e.g., statistically determined, configured by an admin, etc.) while a client associated with an external-to-the-data-center address may be associated with a longer RTT. In some embodiments, characteristics of the network over which the resumption request is received may be used to estimate an RTT (e.g., traffic over private network path may be associated with smaller RTT than traffic over public network paths). In embodiments, a non-secure connection handshake preceding the request from the client to resume the prior secure session, or a network location or geolocation of the client may be used to determine the client round-trip cost. In embodiment's values for the RTT (estimated, statistically or otherwise determined) may be stored with the state information (e.g., as part of the ticket stored at the client or in the session state data store).

In embodiments, the no round-trip cost is determined and then used as a basis for setting a threshold value against which the client round-trip cost is compared. In embodiments, the no round-trip cost may be determined based on a round-trip time between the session state data store 120 and the server and/or a processing time for the session state data store 120 to process state requests (may be based on a transactions per second (TPS) metric for the session state date store, for example). In some embodiments, the no round-trip cost may be an estimate based on one or more characteristics of the network between the server and the session state data store (e.g., an observed average network latency or similar).

At block 408, the particular resumption protocol is selected, based on the client round-trip cost and the no round-trip cost. For example, selection may be based on whether the determined client round-trip cost has reached or exceeded a threshold value that is based on the no round-trip cost. The threshold may be a configurable or updatable threshold value, possibly biased or weighted toward a particular outcome (e.g., a percentage (e.g., 90%) of an average observed or estimated no round-trip cost). In some embodiments, the threshold may be based on estimates, such as based on an average of prior known or a latest known no round-trip time to the session state data store plus or minus an amount of time for CPU processing at the session state data store (e.g., 1 or 2 milliseconds) as non-exhaustive examples. The client round-trip cost may also be based on observed or estimated characteristics of resources (e.g., latencies associated with the particular network resources over which traffic from the client is transmitted, processing times or other behavior (e.g., dropped connections) associated with the requesting client resources (memory, CPU, etc.)). Other criteria may serve as basis for the selection, such as local host resource availability (e.g., CPU/memory).

For the case where the state information is available locally, a Connection Manager 302 may select the no-round-trip-to-client-based resumption process to use local information to resume the secure connection, avoiding additional resource usage associated with the server in reaching out over the network as part of the client-round-trip-based resumption process.

In some embodiments, the server may determine that the session state data store 120 has become unresponsive or is exhibiting response times beyond some threshold (the cost associated with the no-round-trip-to-client-based resumption process has increased) and may determine to perform the client-round-trip-based resumption process instead of the no-round-trip-to-client-based resumption process due to the non-responsiveness of or latency associated with communications between the server and the session state data store.

At block 412 (for selection of the no-round-trip protocol option) the session state data store is accessed, to check for state information useful in avoiding replay attacks, for example.

At block 410, the secure session resumption handshake is performed, for the case where the client round-trip protocol is selected. The handshake reestablishes the prior secure connection, reusing one or more keys established in the prior secure session, for example.

At block 414, the secure session is resumed.

Figure 5:
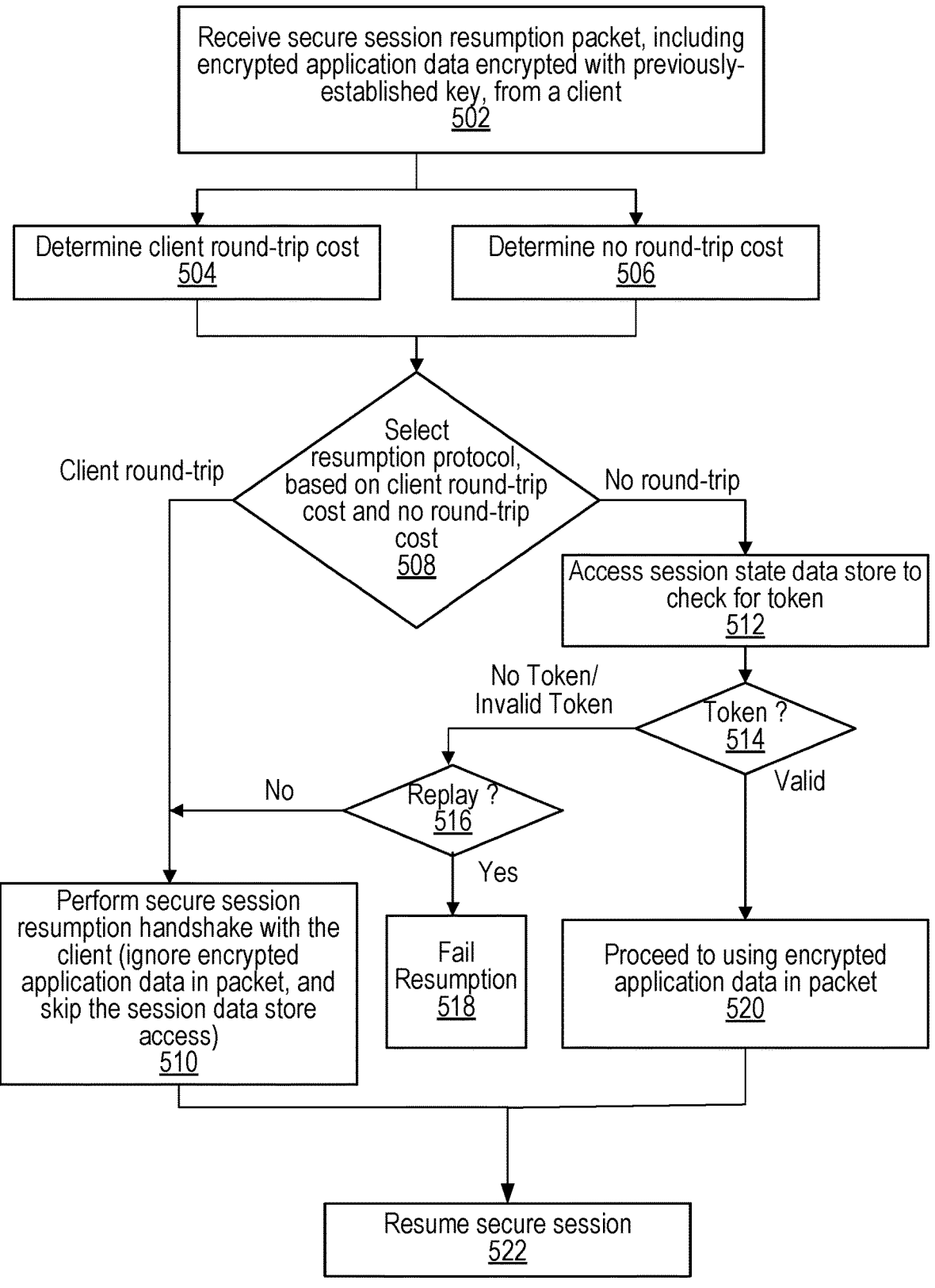
FIG. 5 is another process diagram that illustrates another packet processing process for a system for secure session resumption protocol selection based on resource analysis, according to some embodiments.

FIG. 5 is another process diagram that illustrates another packet processing process for a system for secure session resumption protocol selection based on cost analysis, according to some embodiments. Various functionalities of the illustrated process may be performed by components of a Connection Manager 302, in embodiments.

At block 502, a secure session resumption packet is received. In the illustrated embodiment, the packet includes encrypted application data. The application data may have been encrypted with a key associated with the previously-established secure connection that is requested to be resumed, for example. A client round-trip cost and/or no round-trip cost are determined (blocks 504/506). In some embodiments, the no round-trip cost may be estimated as a prior-established threshold value and the client round-trip cost may be determined in real-time or based on recent data (e.g., based on data associated with an immediately-prior TCP handshake, or based on estimated RTTs for similar traffic over a same or similar network, etc.).

At block 508, a particular resumption protocol is selected, based on the client round-trip cost and the no round-trip cost, for example. In some embodiments, a client round-trip cost is obtained for the particular client and compared to a threshold value established as the no round-trip cost. In the case of selection of the client round-trip option, a secure session resumption handshake is performed with the client (block 510) and the secure session resumed (block 520). Any encrypted application data included in the packet may be ignored in this option. Also, access of the session data store may be skipped in this option. In at least some embodiments, loss of the readily-available encrypted application data as part of this option may be considered as part of the cost of this option (e.g., as part of the cost function model used to determine the cost associated with the client round-trip option.

For the no round-trip option (block 508, No round-trip) the session state data store is accessed to check for state data such as a token (e.g., a single-use token) (block 512). In embodiments, checking for a single-use token is just one example of session state that might be maintained to prevent replay attacks. Other techniques for preventing replay attacks are contemplated without departing from the scope of this disclosure. In some embodiments, characteristics of the token or session data store may be evaluated (e.g., token age, session store data loss, etc.) to determine how to proceed. For example, evaluation of the token may include identifying false positive replay attack situations and continuing with the Client round-trip based protocol. For example, if no token is found or if the token appears invalid (514, No token/Invalid token) the system may evaluate whether the request is likely to be a replay attack (block 516). If evaluation of the token indicates a replay attack (block 516, yes) the resumption fails (block 518) and an error may be generated. If evaluation of the token indicates there is not a replay attack (block 516, no) the process may perform the Client round-trip process (block 510) to resume the session, despite lack of a valid token. If a token is found (514, valid) the token is deleted (e.g., atomically) from the session state data store and the application data in the packet is used (block 520).

The secure session is resumed (block 522).

Figure 6:
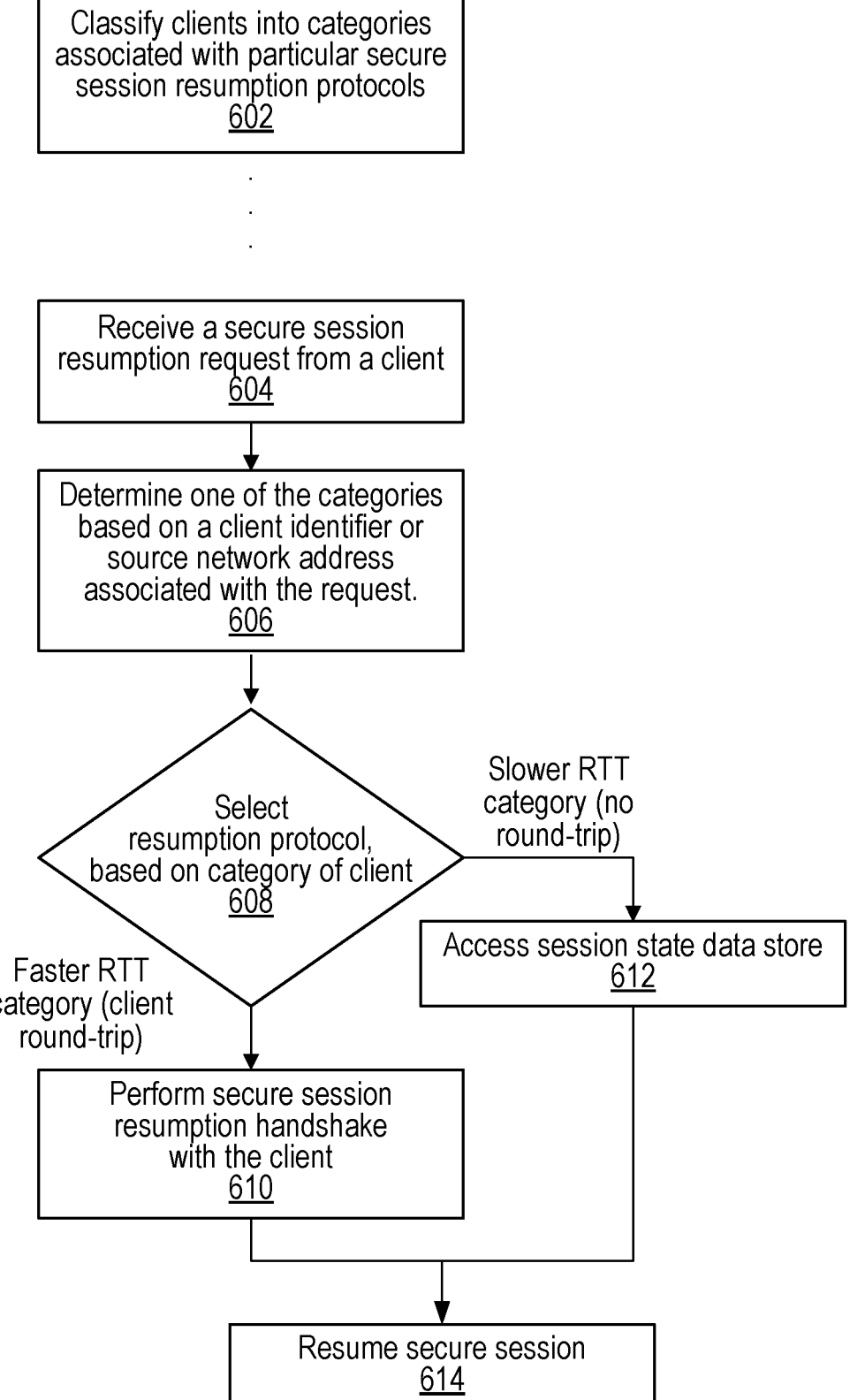
FIG. 6 is another process diagram that illustrates another packet processing process for a system for secure session resumption protocol selection based on resource analysis, according to some embodiments.

FIG. 6 is another process diagram that illustrates another packet processing process or protocol for a system for secure session resumption protocol selection based on resource analysis, according to some embodiments. In embodiments, functionality depicted in, and described with regard to, FIG. 6 may be performed by one or more components illustrated in FIGS. 1A, 1B, 2, 3, 7, and 8.

At block 602, clients 140 are classified into categories associated with particular secure session resumption protocols (e.g., a category indicative of a slower RTT, such as an external or public network category or a network traffic type associated with a slower RTT, may be associated with a no-round-trip-to-client-based resumption protocol, whereas a category indicative of a faster RTT, such as an internal or private network category, or a network traffic type associated with a faster RTT, may be associated with a client-round-trip-based resumption protocol, etc.). This classification may be performed asynchronously with (e.g., prior to) the functionality illustrated in blocks 606-614, in embodiments, as system configuration or set up for example.

At block 604, a secure session resumption request is received from a client, and a category of the client is determined (e.g., based on a client identifier or source network address associated with the request) at block 606. At block 608, a resumption protocol associated with the category or the client is selected. For example, if the client is found to fall within a category indicative of a slower RTT, the no-round-trip-to-client-based resumption protocol may be selected. If the client is found to fall within a category indicative of a faster RTT the client-round-trip-based resumption protocol may be selected. In embodiments, the category-based secure session resumption selection may reduce processing required for selecting a particular protocol (identifying a request as associate with a particular category may use less resources than calculating and comparing cost functions). In embodiments, the categorization may comprises assigning the client as internal or external to a service provider network or data center.

In some embodiments (not illustrated) inputs and analysis described with regard to the cost-based resumption protocol selection illustrated in FIGS. 4 and 5 (described above) may be combined with inputs and analysis described with regard to the category-based resumption protocol selection, without departing from the scope of this disclosure. For example, both costs and categories may be considered in selecting the resumption protocol. In embodiments, various of the cost, category or other considerations may be weighted or scored to determine resumption protocol selection (e.g., based on the lesser cost).

In a particular, non-exhaustive example, Session Resumption Cost Analyzer 112 may include logic (e.g., implemented as program instructions) to select the no round-trip-based protocol for all requests originating external to a service provider network in which the Session Resumption Cost Analyzer 112 is implemented (category-based selection). The Session Resumption Cost Analyzer 112 may also include logic (e.g., implemented as program instructions) to monitor (e.g., track failed requests), or receive metrics about (e.g., processing load, available memory, etc.) the Session state data store 120, and to override the above-described selection of the no round-trip-based protocol for all requests originating external to a service provider network and to instead select the client-round-trip-based protocol when the Session State Data Store 120 is under heavy load or otherwise found unavailable.

For the client round-trip option (associated with the faster RTT category, in embodiments), a secure session resumption handshake may be performed with the client (block 610). For the no-round-trip option (associated with the slower RTT category, in embodiments), the session state date store may be accessed (block 612) (e.g., to access state information that may be used to prevent replay attacks, or the like). FIG. 6 illustrates that, in either case, the secure session is resumed (block 614) using the selected resumption protocol.

Figure 7:
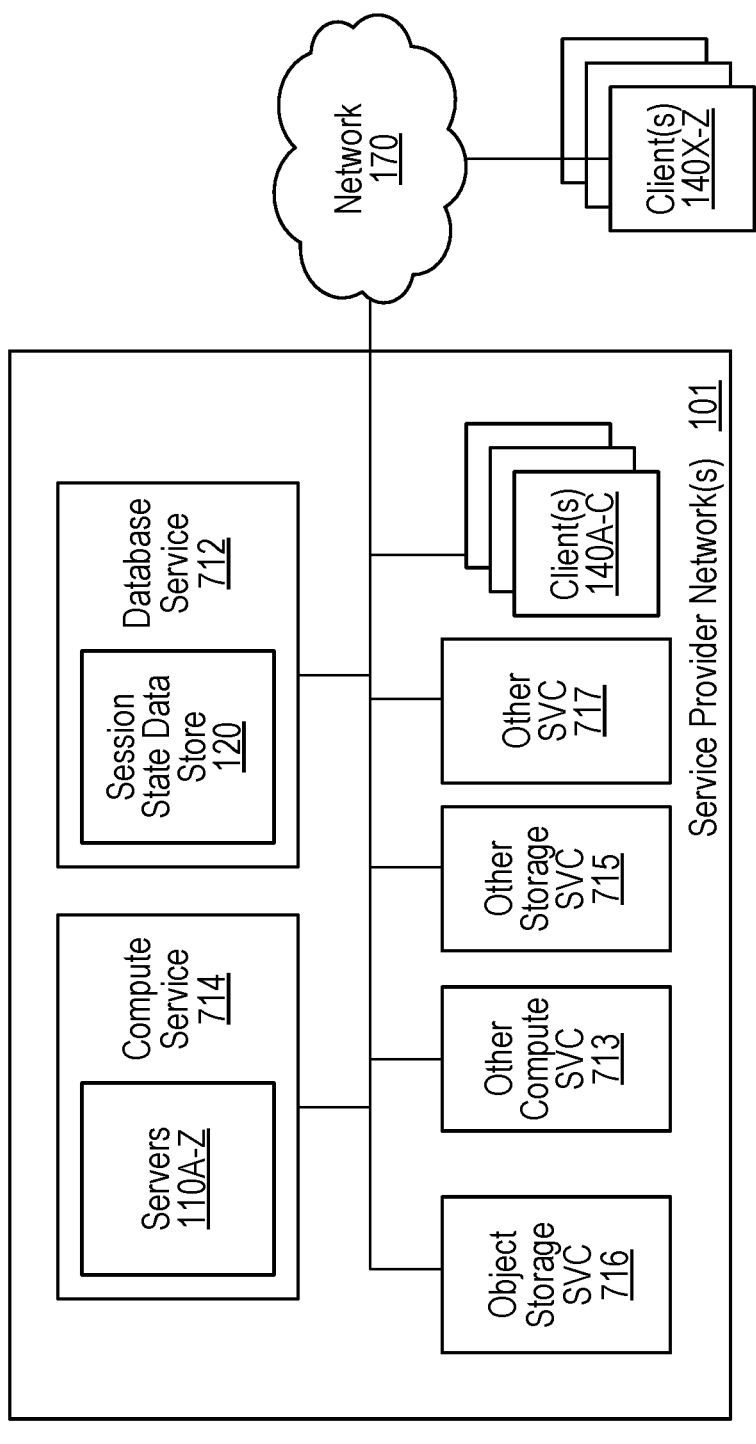
FIG. 7 is a block diagram that illustrates an example service provider network embodiment for a system for secure session resumption protocol selection based on resource analysis, according to some embodiments.

FIG. 7 is a block diagram that illustrates an example service provider network embodiment for a system for secure session resumption protocol selection based on resource analysis, according to some embodiments. In the illustrated embodiment, a system for secure session resumption protocol selection based on cost analysis is implemented on Service Provider Network(s) 101.

As described in embodiments herein, external Client(s) 140X-Z and/or internal Client(s) 140A-C may send secure session resumption requests (e.g., as TCP packets) to servers 110A-Z implemented on Compute Service 714 of the Service Provider Network(s) 101. Servers 110A-Z may each include a Session Resumption Cost Analyzer 112 that determines costs associated with various different resumption protocols and selects a particular resumption protocol to apply to resume the requested secure connection.

In embodiments, the Service Provider Network(s) 101 may connect and/or host various different services provided by a multi-tenant service provider to clients 140. FIG. 7 illustrates non-exhaustive example services as Compute Service 714, Object Storage Service 716, Database Service 712 (hosting a Session State Data Store 120), Other Compute Service 713, Other Storage Service 715, and Other Service 717.

Example Computer System

Figure 8:
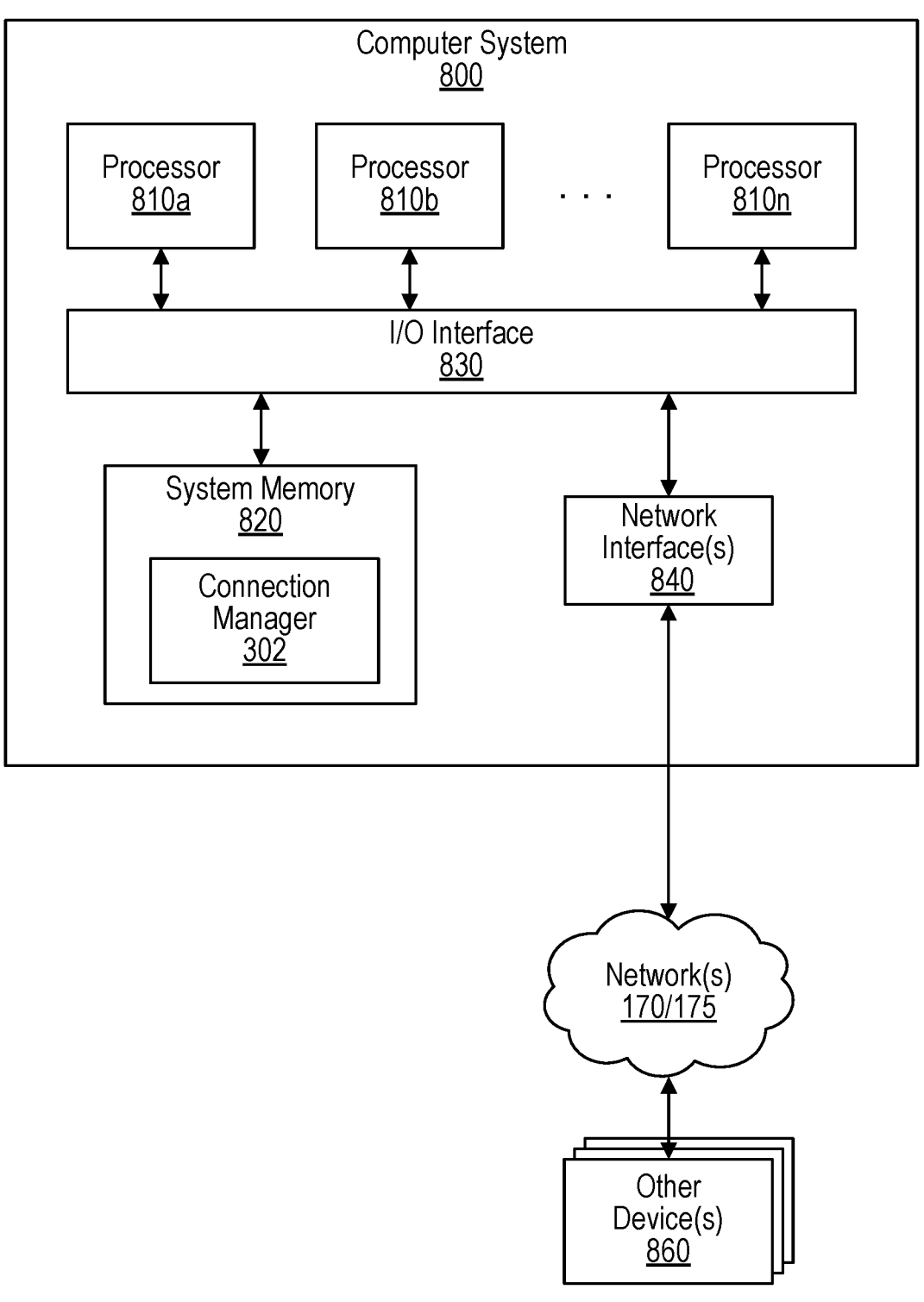
FIG. 8 is a block diagram that illustrate an example of a computer system, one or more of which may implement various components associated with secure session resumption protocol selection based on resource analysis, according to some embodiments, described and illustrated throughout the disclosure, according to embodiments.

FIG. 8 illustrates an example of a computer system, one or more of which may implement various components of a system for secure session resumption protocol selection based on resource analysis, described and illustrated throughout the disclosure, according to embodiments.

Various portions of systems in FIGS. 1A, 1B, 2, 3, 7, 8 and/or methods presented in FIGS. 4, 5, and 6 described herein, may be executed on one or more computer systems similar to that described herein, which may interact with various other devices of the system.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 860, such as cursor control device, keyboard, audio device, and display(s). In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for a system for secure session resumption protocol selection based on resource analysis may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 820 may be configured to store program instructions and/or data accessible by processor 810. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a system for secure session resumption protocol selection based on resource analysis, are shown stored within system memory 820 as Connection Manager 302. In other embodiments, program instructions and/or data may be received, sent, or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840. Program instructions may include instructions for implementing the techniques described with respect to any of the FIGS.

In some embodiments, I/O interface 830 may be configured to coordinate I/O traffic between processor 810, system memory 820, and any peripheral devices in the device, including network interface 840 or other peripheral interfaces, such as input/output devices. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to networks 170/175, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Computing device 800 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 800. Multiple input/output devices may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Memory 820 may include program instructions (e.g., such as Connection Manager 302) and data (e.g., Session State Data Store 120) accessible by the program instructions. In one embodiment, program instructions may include software elements of a method illustrated in the above figures. Session State Data Store 120 may include data that may be used in embodiments described herein. In other embodiments, other or different software elements and/or data may be included.

Those skilled in the art will appreciate that computer system 800 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present solution may be practiced with other computer system configurations. In some embodiments, portions of the techniques described herein (e.g., a system for secure session resumption protocol selection based on resource analysis) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors and corresponding memory storing program instructions to implement a frontend to receive requests from clients associated with an application;
a session state data store for storing state information associated with secure sessions between the clients and a plurality of servers executing the application;
one or more processors and corresponding memory storing program instructions to implement the plurality of servers, individual servers of the plurality of servers respectively comprising respective server-side secure session managers configured to:
receive a request from a client to resume a prior secure session between the client and the server using a secure session resumption process of a plurality of secure session resumption processes;
determine a client-round-trip latency or resource impact for resumption of the secure session via a client-round-trip-based resumption process that requires a round trip between the server and the client;
determine a no-round-trip-to-client latency or resource impact for resumption of the secure session via a no-round-trip-to-client-based resumption process, wherein the no-round-trip-to-client-based resumption process comprises accessing the session state data store to access data for preventing replay attacks;
select between the no-round-trip-to-client-based resumption process and the client-round-trip-based resumption process, based on a comparison of the client-round-trip latency or resource impact and the no-round-trip-to-client latency or resource impact; and
use the selected resumption process to resume the requested secure session to the client.

2. The system of claim 1, wherein:
the selected resumption process comprises reusing one or more encryption keys from the prior secure session; and
said use the selected resumption process to resume the requested secure session to the client comprises reusing the one or more encryption keys from the prior session to resume the prior secure session.

3. The system of claim 1, wherein:
the resumed secure session is between the client and a different server than the server in the prior secure session; and
the server in the prior secure session and the different server host an instance or component of a same application.

4. The system of claim 1, wherein:
the session state date store and the application are implemented on or across one or more services of a service provider that provides compute and storage services for clients of the service provider; and
the frontend is configured as one or more load balancers, hosted by the service provider and configured to load balance requests, comprising the request, across instances of the application hosted by resources of the service provider.

5. The system of claim 4, wherein:

one or more of the clients are hosted within a service provider network of the service provider, and one or more of the clients are external to the provider network; and said determine a client-round-trip latency or resource impact for resumption of the secure session comprises determining the client-round-trip latency or resource impact based on whether one or more networks of the corresponding round trip are internal or external to the service provider network.

6. A method, performed by one or more processors of one or more computing devices, the method comprising:

responsive to a request from a client to resume a prior secure session between the client and a server:

determining a client-round-trip cost for resumption of the secure session via a client-round-trip-based resumption process that requires a round trip between the server and the client;

determining a no-round-trip-to-client-based resumption cost for resumption of the secure session via a no-round-trip-to-client-based resumption process;

selecting between the no-round-trip-to-client-based resumption process and the client-round-trip-based resumption process, based on a comparison of the client-round-trip cost and the no-round-trip-to-client cost; and using the selected resumption process to resume the secure session to the client.

7. The method of claim 6, wherein:

said selecting between the no-round-trip-to-client-based resumption process and the client-round-trip-based resumption process comprises selecting the no-round-trip-to-client-based resumption process; and performing said using the selected resumption process to resume the secure session to the client comprises checking a session state data store for session state data used to prevent replay attacks.

8. The method of claim 7, wherein said determining a no-round-trip-to-client cost for resumption of the secure session is based at least in part on an amount of time to contact and receive a response from the session state data store.

9. The method of claim 8, wherein:

the request comprises a packet including encrypted application data encrypted using a key from the prior secure session; and using the no-round-trip-to-client resumption process to resume the secure session to the client comprises decrypting the encrypted application data with a key from the prior secure session.

10. The method of claim 6, wherein:

the request comprises a packet including encrypted application data encrypted using a key from the prior secure session;

the no-round-trip-to-client-based resumption process comprises checking a session state data store for session state data used to prevent replay attacks;

said selecting between the no-round-trip-to-client-based resumption process and the client-round-trip-based resumption process comprises selecting the client-round-trip-based resumption process to resume the secure session to the client; and said using the client-round-trip-based resumption process to resume the secure session to the client comprises:

performing a secure session handshake with the client; and resuming the secure session without processing the encrypted application data from the packet; and the secure session is resumed, via the client-round-trip-based resumption process, without accessing the session state data store.

11. The method of claim 6, wherein said selecting between the resumption processes based on a comparison of the costs comprises selecting the no-round-trip-to-client-based resumption process based on the cost of the no-round-trip-to-client-based resumption process being less than the client-round-trip-based resumption process by a threshold amount.

12. The method of claim 11, wherein the client-round-trip cost is based at least in part on an estimated round-trip network transmission latency between the server and the client; and wherein the no-round-trip-to-client cost is based at least in part on an estimated round-trip network transmission latency between the server and a session state data store and a data processing time associated with accessing the session state data store.

13. The method of claim 12, wherein:

the estimated round-trip network transmission latency between the server and the client is based on:

a non-secure connection handshake preceding the request from the client to resume the prior secure session, or a network location or geolocation of the client.

14. One or more non-transitory computer-readable media storing program instructions executable on or across one or more processors to perform:

responsive to a request from a client to resume a prior secure session between the client and a server:

determining a client-round-trip cost for resumption of the secure session via a client-round-trip-based resumption process that requires a round trip between the server and the client;

determining a no-round-trip-to-client-based resumption cost for resumption of the secure session via a no-round-trip-to-client-based resumption process;

selecting between the no-round-trip-to-client-based resumption process and the client-round-trip-based resumption process, based on a comparison of the client-round-trip cost and the no-round-trip-to-client cost; and using the selected resumption process to resume the secure session to the client.

15. The one or more non-transitory computer-readable media of claim 14, wherein:

said selecting between the no-round-trip-to-client-based resumption process and the client-round-trip-based resumption process comprises selecting the no-round-trip-to-client-based resumption process; and performing said using the selected resumption process to resume the secure session to the client comprises checking a session state data store for session state data used to prevent replay attacks.

16. The one or more non-transitory computer-readable media of claim 15, wherein said determining a no-round-trip-to-client cost for resumption of the secure session is based at least in part on an amount of time to contact and receive a response from the session state data store.

17. The one or more non-transitory computer-readable media of claim 16, wherein:

the request comprises a packet including encrypted application data encrypted using a key from the prior secure session; and using the no-round-trip-to-client resumption process to resume the secure session to the client comprises decrypting the encrypted application data with a key from the prior secure session.

18. The one or more non-transitory computer-readable media of claim 14, wherein:

the request comprises a packet including encrypted application data encrypted using a key from the prior secure session;

the no-round-trip-to-client-based resumption process comprises checking a session state data store for session state data used to prevent replay attacks;

said selecting between the no-round-trip-to-client-based resumption process and the client-round-trip-based resumption process comprises selecting the client-round-trip-based resumption process to resume the secure session to the client; and said using the client-round-trip-based resumption process to resume the secure session to the client comprises:

performing a secure session handshake with the client; and resuming the secure session without processing the encrypted application data from the packet; and the secure session is resumed, via the client-round-trip-based resumption process, without accessing the session state data store.

19. The one or more non-transitory computer-readable media of claim 14, wherein:

wherein said selecting between the resumption processes based on a comparison of the costs comprises selecting the no-round-trip-to-client-based resumption process based on the cost of the no-round-trip-to-client-based resumption process being less than the client-round-trip-based resumption process by a threshold amount.

20. The one or more non-transitory computer-readable media of claim 19, wherein:

wherein the client-round-trip cost is based at least in part on an estimated round-trip network transmission latency between the server and the client; and wherein the no-round-trip-to-client cost is based at least in part on an estimated round-trip network transmission latency between the server and a session state data store and a data processing time associated with accessing the session state data store.

\* \* \* \* \*